United States Patent Office 2,982,150
Patented May 2, 1961

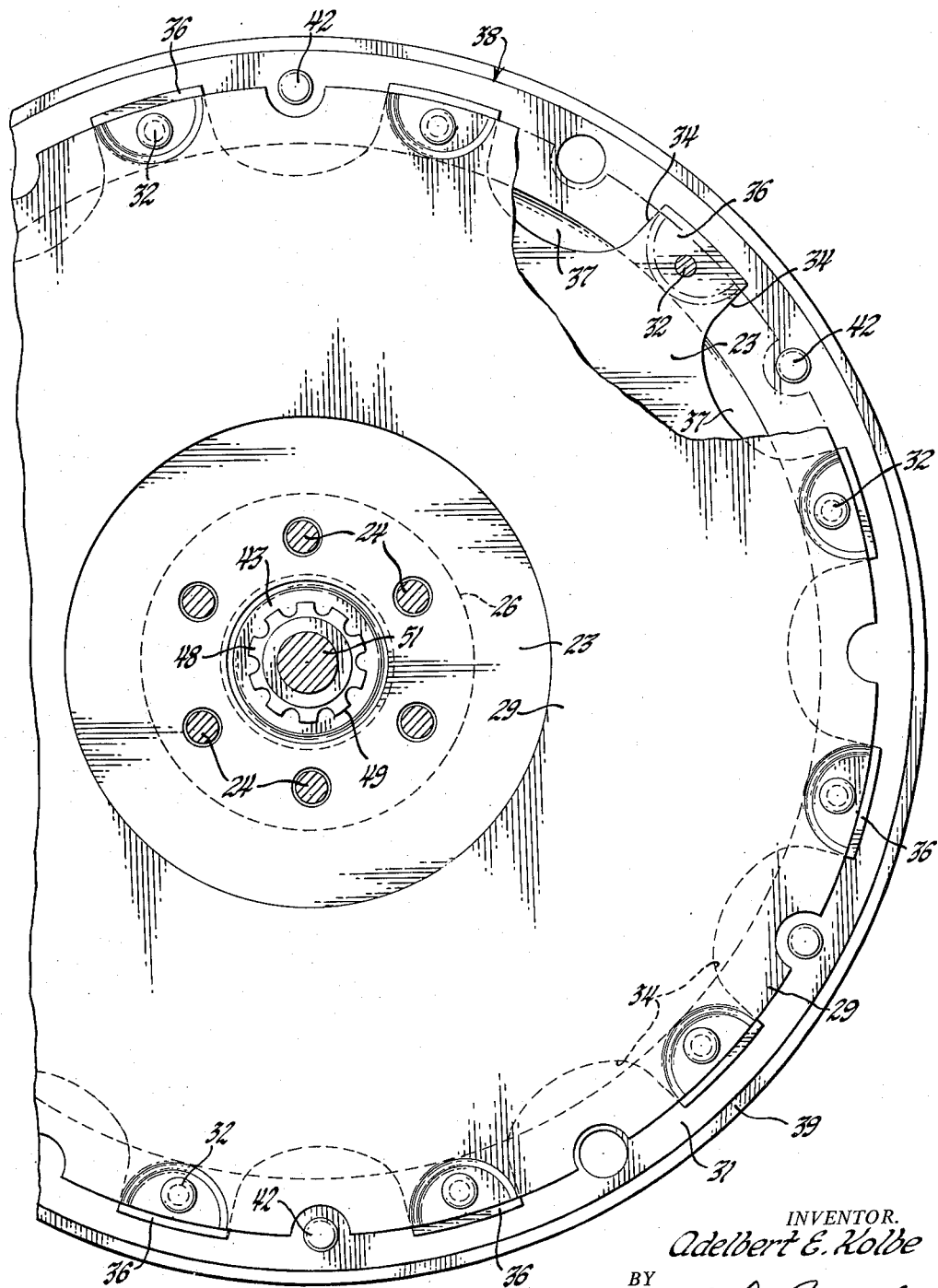

2,982,150

INTERNAL COMBUSTION ENGINE FLYWHEEL

Adelbert E. Kolbe, Berkley, Mich., assignor to General Motors Corporation, Detroit, Mich., a corporation of Delaware Filed Sept. 17, 1959, Ser. No. 840,583

3 Claims. (Cl. 74—574)

This invention relates to flywheels for internal combustion engines and particularly to means providing a flexible flywheel for reducing the vibration resulting from the operation of an internal combustion or other engine.

As the horsepower to weight ratio decreases in internal combustion engines it has become increasingly difficult to prevent vibrations that produce noise and that are often transmitted to a motor vehicle in which an internal combustion engine may be employed. The power impulses on the working stroke of the pistons of such engines tend to distort or bend the crankshaft unless an excessively strong engine frame is employed.

It is now proposed to change the flywheel construction so that the vibrations in the crankshaft will not be noticeably transmitted to the flywheel. If the tendency of the flywheel to vibrate can be reduced, then it will be apparent that the objectionable transmission of vibrations to the motor vehicle also will be reduced.

In the drawings:

Figure 2 is a cross-sectional view of the flywheel taken substantially in the plane of line 2—2 of Figure 1, looking in the direction of the arrows.

Figure 1:
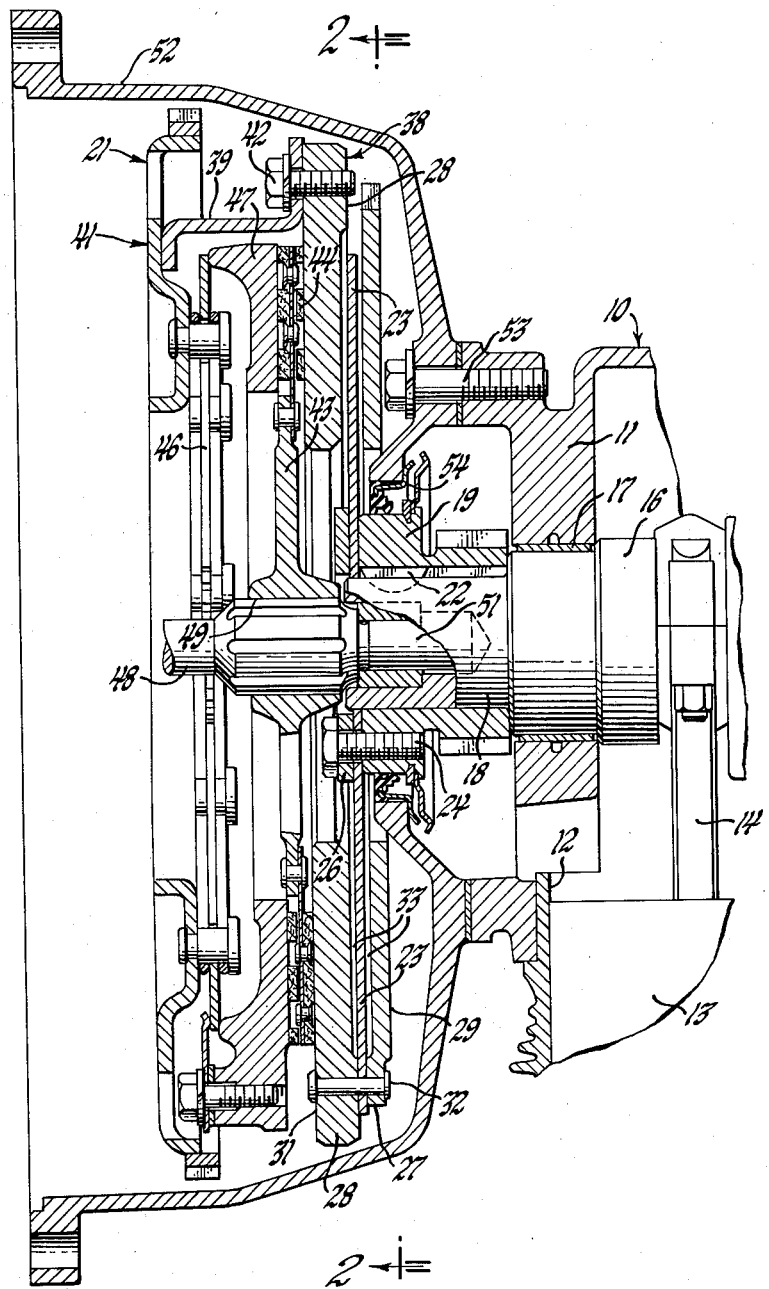
Figure 1 is a fragmentary cross-sectional view of an internal combustion engine having a flywheel embodying the principles of the invention.

The engine 10 embodying the invention comprises an engine frame 11 having one or more rows of cylinders 12 formed therein. The cylinders have pistons 13 connected by connecting rods 14 to the crankshaft 16 of the engine, which is mounted in the frame 11 in bearings 17. The crankshaft 16 has an end 18 projecting beyond the bearing 17 at one end of the engine, for the purpose of driving the motor vehicle or other device with which the engine may be employed.

Pressfitted on the crankshaft end 18 is a hub 19 adapted to support a flywheel and clutch unit indicated generally at 21. The hub may be keyed or otherwise secured to the shaft end 18 at 22. The outer end of the hub 19 has a surface normal to the axis of rotation of the crankshaft 16 and against which the inner peripheral edge of an annular plate member 23 is adapted to be secured by bolts 24 and a securing ring 26. The outer edge of the plate member 23 is adapted to be secured between annular flanges or other suitable supporting means 27 and 28 formed on inner and outer flywheel members 29 and 31 respectively. The plate member may be secured between the flywheel members at spaced intervals by rivets or other suitable securing means indicated at 32. The flywheel members 29 and 31 are relieved on the adjacent surfaces thereof within the annular flanges 27 and 28 to provide annular spaces 33 which are made wide enough to prevent the plate member 23 from engaging the flywheel members 29 and 31 in the event the plate member is axially deflected by crankshaft vibrations resulting from the operation of the engine 10. The plate member 23 may be arcuately relieved around the outer periphery thereof to provide recesses or scallops indicated at 34. The scallops are formed between the parts of the flanges 27 and 28 secured by the rivets 32 to the outer edge of the plate members 29 and 31. The recesses 34 should extend radially inwardly for some distance and preferably beyond the inner peripheral edges of the flanges 27 and 28. This will tend to provide spokes 36 around the outer periphery of the plate member 23 to increase the flexibility of the plate member 23. The recesses 34 also provide spaces or openings 37 that will drain any fluid collecting in the spaces 33 to the space outwardly of the members 23, 29 and 31. The flywheel unit 38 formed by the members 23, 29 and 31 may be secured to a driving element 39 of a clutch 41 by securing means 42. The driven clutch element 43 may be provided with clutch disc means 44 to be releasably engaged by actuating means 46 between the movable engaging ring 47 of the clutch 41 and the adjacent surface of the flywheel member 31. This may be done when it is desired to drive the vehicle or other device with which the engine 10 may be employed. The driven clutch member 43 may be mounted on a transmission shaft 48 on splines indicated at 49. The end of the transmission shaft 48 may be reduced to form a pilot end 51 adapted to extend within a pilot opening in the crankshaft end 18 to center the shaft 48 and the clutch and flywheel unit 21 with respect to the crankshaft 16 of the engine. The clutch and flywheel unit 21 may be enclosed in any suitable housing 52 that may be secured to the frame 11 of the engine 10 by bolts 53. Sealing means 54 may be employed between the clutch and flywheel housing 52 and the hub 19 to limit the leakage of oil from the engine 10.

What is claimed is:

1. A flywheel for an internal combustion engine having a crankshaft supported by a bearing and having an end projecting outwardly from one end of said engine and beyond said bearing, and comprising a hub adapted to be projected on said crankshaft end and having means associated therewith for securing said hub to said crankshaft end for rotation with said crankshaft, a flexible plate member secured to said hub in normal relation to the axis of rotation of said crankshft and extending radially outwardly therefrom, and a pair of flywheel members disposed on opposite sides of said plate member and having axially extending supporting means formed on adjacent sides thereof and adapted to engage said plate member adjacent the outer peripheral edge of said plate member, said flywheel members being relieved inwardly of said supporting means to provide spaces for the flexible movement of said plate member inwardly of said supporting means without engaging said flywheel members, and peripherally spaced means for securing said plate member to said supporting means and between said flywheel members.

2. A flywheel for an internal combustion engine having a crankshaft supported by a bearing and having an end projecting outwardly from one end of said engine and beyond said bearing, and comprising a hub adapted to be projected on said crankshaft end and having means associated therewith for securing said hub to said crankshaft end for rotation with said crankshaft, a flexible plate member secured to said hub in normal relation to the axis of rotation of said crankshaft and extending radially outwardly therefrom, and a pair of flywheel members disposed on opposite sides of said plate member and having axially extending supporting means formed on adjacent sides thereof and adapted to engage said plate member adjacent the outer peripheral edge of said plate member, said flywheel members being relieved inwardly of said supporting means to provide spaces for the flexible movement of said plate member inwardly of said supporting means without engaging said flywheel members, and peripherally spaced means for securing said plate member to said supporting means and between said flywheel members, said plate member being relieved between said peripherally spaced means to increase the flexibility of said plate member and to provide means for exhausting said spaces between said members.

3. A flywheel for an internal combustion engine having a crankshaft supported by a bearing and having an end projecting outwardly from one end of said engine and beyond said bearing, and comprising a hub adapted to be projected on said crankshaft end and having means associated therewith for securing said hub to said crankshaft end for rotation with said crankshaft, a flexible plate member secured to said hub in normal relation to the axis of rotation of said crankshaft and extending radially outwardly therefrom, and a pair of flywheel members disposed on opposite sides of said plate member and having axially extending supporting means formed on adjacent sides thereof and adapted to engage said plate member adjacent the outer peripheral edge of said plate member, said flywheel members being relieved inwardly of said supporting means to provide spaces for the flexible movement of said plate member inwardly of said supporting means without engaging said flywheel members, and peripherally spaced means for securing said plate member to said supporting means and between said flywheel members, said plate member being relieved between said peripherally spaced means to increase the flexibility of said plate member and to provide means for exhausting said spaces between said members.

References Cited in the file of this patent

UNITED STATES PATENTS

| | | |
|---|---|---|
| 1,753,365 | Daukas | Apr. 8, 1930 |
| 2,092,571 | Cole | Sept. 7, 1937 |
| 2,142,178 | Cole et al. | Jan. 3, 1939 |
| 2,473,335 | Hardy | June 14, 1949 |